(12) United States Patent
Head et al.

(10) Patent No.: US 8,902,790 B2
(45) Date of Patent: Dec. 2, 2014

(54) METHOD AND APPARATUS FOR OPERATING A NETWORK MAPPING TOOL TO PERFORM HOST DISCOVERY

(75) Inventors: Michael R Head, Tarrytown, NY (US); Anca Sailer, Scarsdale, NY (US); Hidayatullah Habeebullah Shaikh, Mohegan Lake, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 12/729,648

(22) Filed: Mar. 23, 2010

(65) Prior Publication Data

US 2011/0235544 A1  Sep. 29, 2011

(51) Int. Cl.
*H04L 12/28* (2006.01)
*H04L 12/24* (2006.01)
*H04L 12/26* (2006.01)

(52) U.S. Cl.
CPC ............ *H04L 43/0817* (2013.01); *H04L 41/12* (2013.01)
USPC .......................................... 370/255; 709/224

(58) Field of Classification Search
CPC . H01L 41/12; H01L 63/1416; H01L 12/2602; H01L 45/42; G06Q 10/063
USPC ............................ 370/254–255; 709/223–226
See application file for complete search history.

(56) References Cited

U.S. PATENT DOCUMENTS

| | | | | |
|---|---|---|---|---|
| 7,664,845 B2* | 2/2010 | Kurtz et al. | ................ | 709/224 |
| 7,849,502 B1* | 12/2010 | Bloch et al. | ................ | 726/11 |
| 8,108,930 B2* | 1/2012 | Hoefelmeyer et al. | ......... | 726/23 |
| 8,135,823 B2* | 3/2012 | Cole et al. | ................. | 709/224 |
| 2004/0214570 A1* | 10/2004 | Zhang et al. | .............. | 455/426.2 |
| 2005/0010819 A1* | 1/2005 | Williams et al. | .............. | 713/201 |
| 2006/0129415 A1* | 6/2006 | Thukral et al. | ................. | 705/1 |
| 2006/0133297 A1* | 6/2006 | Quist et al. | ................. | 370/254 |
| 2009/0070785 A1* | 3/2009 | Alvez et al. | ................. | 719/318 |
| 2009/0122721 A1* | 5/2009 | Ko et al. | ..................... | 370/254 |

OTHER PUBLICATIONS

Nmap—Free Security Scanner for Network Exploration & Security Audits, Vulnerability Scanner downloaded from http://nmap.org on Sep. 21, 2009—including: Introduction; Chapter 8 Table of Contents; Usage and Examples; Understanding an Nmap Fingerprint; Fingerprinting Method Avoided by Nmap; TCP/IP Finterprinting Methods Supported by Nmap; Dealing with Misidentified and Unidentified Hosts; OS Matching Algorithms;Options Summary, Chapter 15. NMap Reference Guide (downloaded on Nov. 13, 2009).
Class ThreadPoolExecutor, ThreadPoolExecution (Java 2 Platform SE 5.0), http://java.sun.com/j2se/1.5.0/docs/api/java/util/concurrent/ThreadPoolExecutor.html (downloaded on Mar. 10, 2010 (18 pgs)).
"Nmap", Wikipedia, Sep. 18, 2012, 8 pages.

* cited by examiner

*Primary Examiner* — Ayaz Sheikh
*Assistant Examiner* — Mounir Moutaouakil
(74) *Attorney, Agent, or Firm* — Harrington & Smith; Louis J. Percello

(57) ABSTRACT

In accordance with one aspect of the embodiments of this invention there is a method to operate a network mapping tool. The method includes performing a network mapping operation over a first set of ports to generate a list of hosts that are found to be alive; performing a sequential scan on only those hosts in the list to detect the operating system of each host in the list; and performing a parallel port scan to detect characteristics of only those hosts in the list. The characteristics can include an identification of at least applications and services running on the hosts in the list. The second set of ports can be a full set of ports.

18 Claims, 2 Drawing Sheets

METHOD AND APPARATUS FOR OPERATING A NETWORK MAPPING TOOL TO PERFORM HOST DISCOVERY

TECHNICAL FIELD

The embodiments of this invention relate generally to data processing systems and networks and, more specifically, relate to techniques for the automated discovery and characterization of communication network resources.

BACKGROUND

The following abbreviations that appear in the description and/or the drawing figures are defined as follows:
FW firewall
HTTP hypertext transfer protocol
IT information technology
LANA internet assigned numbers authority
IP internet protocol
NMAP network mapper
OS operating system
RMIS remote managed infrastructure services
TCP transport control protocol
UDP user datagram protocol A "port" may be considered as a logical connection point for a computer system or program. When considered in the context of TCP/IP a port can be considered to represent the doorway by which a client program may interact with or exchange information with a particular server program on a computer in a network. In this case the client program is said to use the server program's port number N. Certain applications that use TCP/IP, such as HTTP, have ports with pre-assigned numbers. The entire computing community accepts these ports as a standard and agrees not to use them for private purposes. These are generally referred to as "well-known ports", and have been pre-assigned by the IANA. Other application processes can be dynamically assigned port numbers for each connection. When a service initially is started, it is said to bind to its designated port number. Reference with regard to port numbers can be made to, for example, RFC 768 and RFC 793

The port numbers are divided into three ranges: the well known ports, registered ports, and dynamic and/or private ports. The well known ports are those from 0 through 1023, the registered ports are those from 1024 through 49151, and the dynamic and/or private ports are those from 49152 through 65535. For HTTP service port 80 is defined as a default port number.

In IP specifications the term "host" generally implies a computer that has bi-directional access to other computers on the Internet. A host has a specific host number that, together with the network number, forms its unique IP address. In some contexts a host may be considered to be a node on a network.

Network mapping is used to determine computers or servers, or more generally hosts that are running on a network, and the programs running on the hosts. There are a number of different network mapping tools and programs that are in use.

On example of a network mapping tool is NMAP. NMAP is an open source tool for network exploration and security auditing. NMAP is capable of scanning large networks as well as single hosts. NMAP uses raw IP packets to determine what hosts are available on the network, what services (application name and version) those hosts are offering, what OSs (and OS versions) the hosts are running, what type of packet filters/FWs are in use, and many other network characteristics. While NMAP is commonly used for security audits it is also useful for other tasks such as network inventory, managing service upgrade schedules and monitoring host or service uptime.

By default, NMAP scans items listed in a command line as IP addresses or range of IP addresses on a predefined range of port numbers and attempts to identify the OS, applications (if given a "-sV" option) and services on the active ports.

NMAP OS fingerprinting operates by sending up to 16 TCP, UDP, and ICMP probes to known open and closed ports of the target machine. These probes are specially designed to exploit various ambiguities in the standard protocol RFCs. NMAP then listens for responses to these probes. Dozens of attributes in the responses are analyzed and combined to generate a fingerprint. Every probe packet is tracked and re-sent at least once if there is no response. All of the packets are IPv4 with a random IP ID value. Probes to an open TCP port are skipped if no such port has been found. For closed TCP or UDP ports, NMAP first checks if such a port has been found. If not, NMAP will select a port at random.

However, the approach taken by the conventional use of NMAP proves to be error prone in cases when parallel scanning is involved, which is important for response time performance when the NMAP results are used interactivity. Successive parallel scans on the same host can lead to the "discovery" of different OSs, since NMAP is not always able to take a clear fingerprint of the OS. Referring to, for example, an on-line NMAP book: Chapter 8: Remote OS Detection: Dealing with Misidentified and Unidentified Hosts, one suggestion made for improving results is to scan all ports (using a -p-option in the command line).

As can be appreciated, a need exists to improve the accuracy and repeatability of network scanning tools.

SUMMARY

The foregoing and other problems are overcome, and other advantages are realized, in accordance with the exemplary embodiments of this invention.

In one aspect of the embodiments of this invention there is a method to operate a network mapping tool, comprising performing a network mapping operation over a first set of ports to generate a list of hosts that are found to be alive; performing a sequential scan on only those hosts in the list to detect the operating system of each host in the list; and performing a parallel port scan to detect characteristics of only those hosts in the list.

In another aspect of the embodiments of this invention there is a computer-readable storage medium having computer-executable program code stored thereon or therein. Execution of the program code results in operating a network mapping tool by performing a network mapping operation over a first set of ports to generate a list of hosts that are found to be alive; performing a sequential scan on only those hosts in the list to detect the operating system of each host in the list; and performing a parallel port scan to detect characteristics of only those hosts in the list.

In yet another aspect of the embodiments of this invention there is a system that comprises at least one computer coupled with at least one memory containing computer-executable program code stored thereon or therein. The at least one computer is coupled with a data communications network. Execution of the program code results in the system operating a network mapping tool by performing a network mapping operation over a first set of ports to generate a list of hosts that are found to be alive; performing a sequential scan on only those hosts in the list to detect the operating system of each host in the list; and performing a parallel port scan to detect characteristics of only those hosts in the list.

DETAILED DESCRIPTION

The exemplary embodiments of this invention pertain at least in part to improvements in network mapping procedures. While described below primarily in the context of NMAP, those skilled in the art should appreciate that the embodiments of the invention have a wider applicability, and should not be viewed as having utility only in the context of NMAP.

A non-limiting aspect of this invention addresses the issue of the NMAP OS identification inconsistency when using a conventional, default approach. Steps of the method described by this invention include the following.

NMAP is launched with an option to scan a set of IP address ranges, and find a host or hosts "alive". There is no application discovery at that point. Instead, searching is performed to determine if there are services on the basic OS ports (e.g., tcp, udp, http, win networking (Windows, a registered trademark of Microsoft Corporation, networking)). One potential optimization of this step is to launch NMAP with a "Parallel host scan" option enabled in order to reduce the scanning time. A result of the operation of this step is the generation of a list of hosts alive.

In accordance with the exemplary embodiments of this invention, NMAP is launched again with the options enabled to: (1) scan the IP addresses of the hosts found alive at step 1A, and (2) look up all ports for discovering the OS, applications and services. One potential optimization is to launch NMAP with the "Parallel host scan" and "Probe parallelization" options enabled in order to reduce the scanning time. A result of the operation of this step is raw data including OSs, applications and services that are discovered.

The NMAP output is processed to select the relevant information, and to yield the OSs, applications and services in the network or portion of a network of interest.

Significant advantages of using this procedure are a more accurate assessment of an IT environment of interest, as compared to conventional NMAP default scanning, as well as faster discovery since manual involvement required to validate an uncertain OS is minimized.

Figure 1:
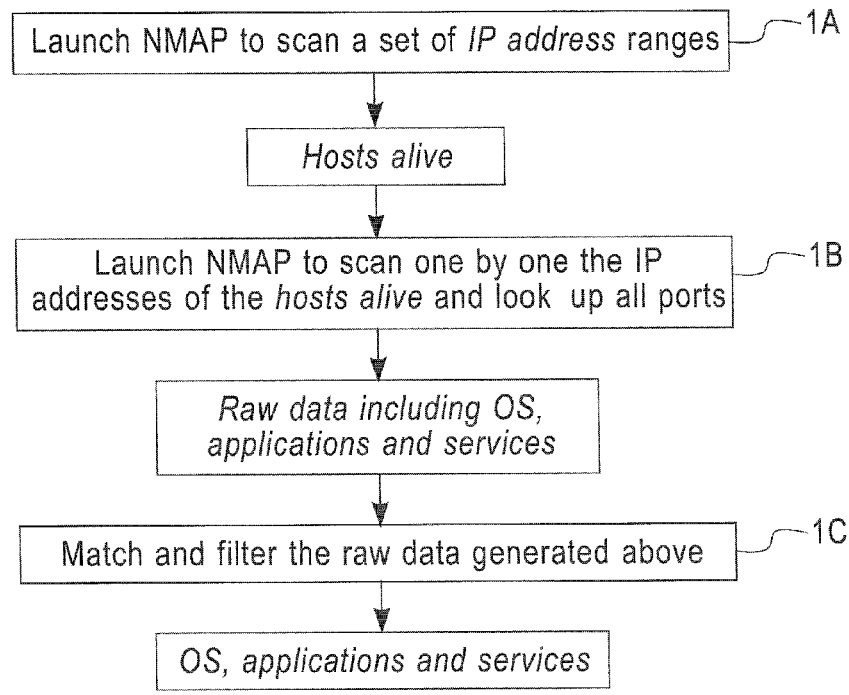
FIG. 1 depicts a logic flow diagram of a process in accordance with the exemplary embodiments of this invention.

FIG. 1 is a logic flow diagram of the optimized NMAP discovery procedure that was briefly described above. Those skilled in the art will appreciate, however, that the specific IT environment can be replaced with any other IT infrastructure without change to the underlying spirit and scope of the invention.

Step 1A: NMAP is launched with the option to scan a set of IP address ranges, and find hosts alive, possibly with the "Parallel host scan" option enabled in order to reduce the scanning time.

A specific embodiment of an NMAP command line to accomplish this step may be:
nmap -OG hostsalive.txt -p 21,22,23,80,135,139,443,445,1030,3389 10.10.20.0/24

Note that only a subset of the full set of ports is specified.

Referring to, for example, Chapter 15: Nmap Reference Guide, Options Summary, the general format (usage) is:
nmap [Scan Type(s)][Options]{target specification};
and in the example given above the -OG command option specifies OS detection with the output scan in Grepable format sent to file "hostsalive.txt", and -p specifies a range of specified port IP addresses to scan.

Step 1B: NMAP is then launched with the option to scan the IP addresses of the hosts found alive at step 1A, and to look up all ports for discovering the OS, applications and services. The option to launch NMAP with the "Parallel host scan" and "Probe parallelization" can be enabled.

A specific embodiment an NMAP command line to accomplish this step may be:
nmap -O -v -sV -sS -p 1-65535 —version-all—append-output -oX In this case the -O command option specifies OS detection, the -v command option specifies increase verbosity level, -sV specifies probe open ports to determine service/version information, -sS specifies a scan technique of TCP SYN, -p specifies all ports in the range of 1 to 65535, --version-all specifies to try every single probe (intensity 9), and --append-output specifies that the output is to be appended to the previously specified "hostsalive.txt" file, and that the hosts to be scanned are those found in the "hostsalive.txt" file as populated with hosts found alive during the first scan of step 1A. The -oX option forces the results to be in XML format to facilitate parsing.

Step 1C: Match and Filter:
a) If NMAP is able to detect an OS that matches a fingerprint, report the OS.
b) Examine the results for certain services (such as Microsoft windows networking) that report OS information and if detected, report that as the OS.
c) If there are matches with a high probability of being accurate (e.g., greater than 90%), report all such matches as options to the user.

Beneficial results of the use of this two-step scanning procedure include, but are not limited to, (i) increased accuracy of detection of OSs, applications and services that exist in a particular IT environment and (ii) an acceleration of the discovery process through parallel scanning.

It can be noted that the original list of ports can be determined by being obtained from the potential RMIS customer. For example, the customer can provide the subnets deployed in his environment. Applications that are in common use have fixed ports that serve as the equivalent of 'well-known ports', e.g., 50000 for DB2. The scanning application tries all the ports on the machines whose IP belong to the subnet identifier provided by the customer.

It can be further noted that the second scan provides the OS with a certain accuracy, while a third scan can provide services that may imply deterministically a certain OS. In this case the certain OS (if available) is used instead of the OS determined from the second scan.

This third scan can be implemented using a pool, e.g., a fixed size pool, of Java™ threads to manage separate invocations of NMAP during the application scan. More specifically, for all live servers a method scans for running applications by creating a queue of jobs that run NMAP with a specific set of options to perform the detailed scan. The queue of jobs in run directly on the thread pool. The first N jobs start immediately, then as each job in the pool completes the next job in the pool is started.

The pool itself is provided by the Java™ platform. One suitable class for this purpose is: Class ThreadPoolExecutor, found in Java™ 2 Platform, Standard Ed. 5.0.

An aspect of this invention is operating a network mapping tool to perform a network mapping operation over a first set of ports to generate a list of hosts that are found to be alive; to perform a sequential scan on only those hosts in the list to detect the operating system of each host in the list; and to performing a parallel port scan to detect characteristics of only those hosts in the list, such as services and applications associated with the hosts in the list.

As will be appreciated by one skilled in the art, aspects of the present invention may be embodied as a system, method and/or computer program product stored on or in a computer-readable storage medium.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 2:
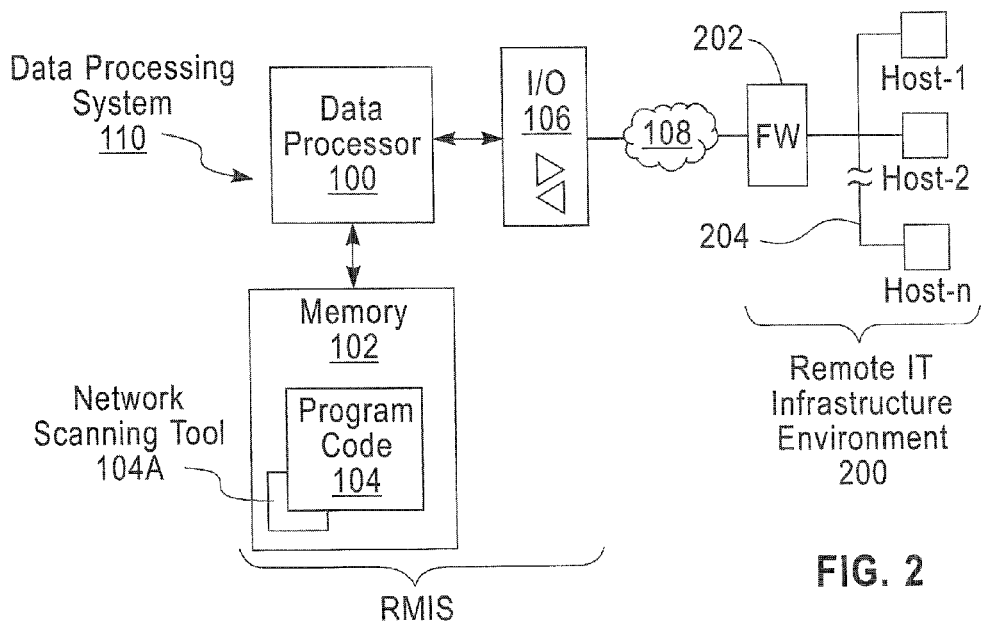
FIG. 2 is a block diagram of a data processing system that is an exemplary embodiment of a system that can be used to perform the process shown in FIG. 1.

Referring to FIG. 2 there is shown an example of a computer or data processor 100 that is coupled with at least one computer readable medium such as a memory 102 that stores executable program code 104 and other information. Also coupled with the computer or data processor 100 is at least one input/output (I/O) circuit 106 suitable for receiving data from a network 108 and for transmitting data to the network. The components shown in FIG. 2 may be considered to represent a data processing system 110.

In one non-limiting embodiment of this invention the data processing system 110 can be a part of a RMIS site that provides a management and monitoring service for a remote IT infrastructure environment 200 that includes one or more hosts (e.g., Host_1, Host_2, . . . , Host_n) that reside behind a FW 202, and that are interconnected via an internal network or networks, such as a local area network 204. The remote IT infrastructure environment 200 may be associated with an on-line retailer or any type of for-profit or not-for-profit organization, and can include web servers, application servers, databases and the like. In this case the enhanced network scanning/mapping tool in accordance with the embodiments of this invention can comprise a part 104A of the program code 104. The enhanced network scanning/mapping tool can be used at least during the initial on-boarding of the remote IT infrastructure environment 200 as a customer/client of the RMIS provider, and can be employed to rapidly and correctly generate an inventory list of IT resources located in the remote IT infrastructure environment 200 that are to be managed/monitored by the RMIS provider.

Reference in this regard may be made to commonly owned and copending U.S. patent application Ser. No. 12/729,672, filed Mar. 23, 2010, entitled "Service Method for Customer Self-Service and Rapid On-Boarding for Remote Information Technology Infrastructure Monitoring and Management", by Anthony Dasari, Michael R. Head, Anca Sailer, Hidayatullah Shaikh, Manu Sharma and Mahesh Viswanathan.

In FIG. 2 any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 3:
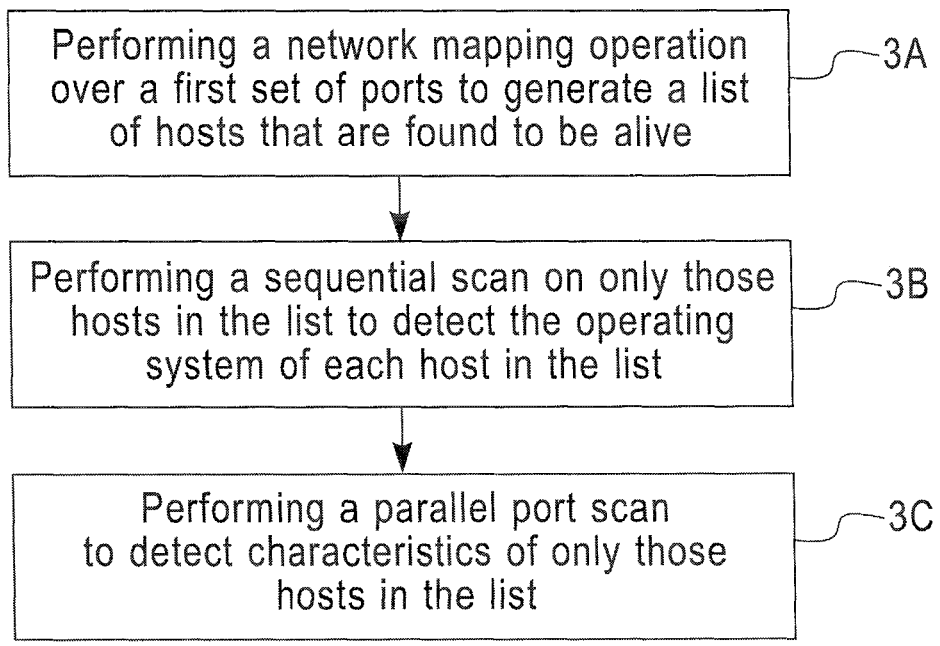
FIG. 3 presents a logic flow diagram that is illustrative of the operation of a method, as well as a result of the execution of computer program instructions, in accordance with exemplary embodiments of this invention.

FIG. 3 presents a logic flow diagram that is illustrative of the operation of a method, as well as a result of the execution of computer program instructions stored in a tangible memory medium, such as the memory 102 of FIG. 2, or provided or conveyed in an intangible form. The operations include, at Block 3A, performing a network mapping operation over a first set of ports to generate a list of hosts that are found to be alive, at Block 3B, performing a sequential scan on only those hosts in the list to detect the operating system of each host in the list and, at Block 3C, performing a parallel port scan to detect characteristics of only those hosts in the list.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium (such as the memory 102 of FIG. 2) that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent network mappers may be used by those skilled in the art. However, all such and similar modifications of the teachings of this invention will still fall within the scope of this invention.

What is claimed is:

1. A method to operate a network mapping tool, comprising:
   using a network mapping tool, during a first scan performing a network mapping operation over a first set of ports to generate a list of hosts that are found to be alive;
   using the same network mapping tool, during a second scan performing a sequential scan on only those hosts in the list to detect an identification of an operating system of each host in the list; and
   using a plurality of invocations of the same network mapping tool, during a third scan performing a parallel port scan on multiple hosts in parallel to detect characteristics of only those hosts in the list, where for each host in the list the detected characteristics imply deterministically an identification of a particular operating system running on the host, and where for a certain one of the hosts in the list if the identification of the particular operating system that is implied deterministically during the third scan differs from the identification of the operating system that was detected for that host during the second scan, identifying as the operating system of that certain one of the hosts the certain operating system that is implied deterministically during the third scan instead of the operating system that was detected during the second scan.

2. The method of claim 1, where the characteristics comprise an identification of applications running on the hosts in the list.

3. The method of claim 1, where the characteristics comprise an identification of server applications running on the hosts in the list.

4. The method of claim 1, where the characteristics comprise an identification of services running on the hosts in the list.

5. The method of claim 1, where the port scan is performed over a full set of ports in the range of port numbers 1-65535.

6. The method of claim 1, where performing the third scan comprises using a pool of threads to manage separate invocations of the network mapping tool.

7. A non-transitory computer-readable storage medium having computer-executable program code stored thereon or therein, execution of the program code resulting in operation of a network mapping tool, comprising operations of:
   using a network mapping tool, during a first scan performing a network mapping operation over a first set of ports to generate a list of hosts that are found to be alive;
   using the network mapping tool, during a second scan performing a sequential scan on only those hosts in the list to detect the operating system of each host in the list; and using a plurality of invocations of the same network mapping tool, during a third scan performing a parallel port scan on multiple hosts in parallel to detect characteristics of only those hosts in the list, where for each host in the list the detected characteristics imply deterministically an identification of a particular operating system running on the host, and where for a certain one of the hosts in the list if the identification of the particular operating system that is implied deterministically during the third scan differs from the identification of the operating system that was detected for that host during the second scan, identifying as the operating system of that certain one of the hosts the certain operating system that is implied deterministically during the third scan instead of the operating system that was detected during the second scan.

8. The non-transitory computer-readable storage medium of claim 7, where the characteristics comprise an identification of applications running on the hosts in the list.

9. The non-transitory computer-readable storage medium of claim 7, where the characteristics comprise an identification of server applications running on the hosts in the list.

10. The non-transitory computer-readable storage medium of claim 7, where the characteristics comprise an identification of services running on the hosts in the list.

11. The non-transitory computer-readable storage medium of claim 7, where the port scan is performed over a full set of ports in the range of port numbers 1-65535.

12. The non-transitory computer-readable storage medium of claim 7, where performing the third scan comprises using a pool of threads to manage separate invocations of the network mapping tool.

13. A system comprising at least one computer coupled with at least one memory containing computer-executable program code stored thereon or therein, the at least one computer being coupled with a data communications network and the execution of the program code resulting in the system operating a network mapping tool, comprising:

using a network mapping tool, during a first scan performing a network mapping operation over a first set of ports to generate a list of hosts that are found to be alive;

using the same network mapping tool, during a second scan performing a sequential scan on only those hosts in the list to detect the operating system of each host in the list; and using a plurality of invocations of the same network mapping tool, during a third scan performing a parallel port scan on multiple hosts in parallel to detect characteristics of only those hosts in the list, where for each host in the list the detected characteristics imply deterministically an identification of a particular operating system running on the host, and where for a certain one of the hosts in the list if the identification of the particular operating system that is implied deterministically during the third scan differs from the identification of the operating system that was detected for that host during the second scan, identifying as the operating system of that certain one of the hosts the certain operating system that is implied deterministically during the third scan instead of the operating system that was detected during the second scan.

14. The system of claim 13, where the characteristics comprise an identification of applications running on the hosts in the list.

15. The system of claim 13, where the characteristics comprise an identification of server applications running on the hosts in the list.

16. The system of claim 13, where the characteristics comprise an identification of services running on the hosts in the list.

17. The system of claim 13, where the port scan is performed over a full set of ports in the range of port numbers 1-65535.

18. The system of claim 13, where performing the third scan comprises using a pool of threads to manage separate invocations of the network mapping tool.

* * * * *